United States Patent
Bennett

[19]

[11] Patent Number: 5,898,283
[45] Date of Patent: Apr. 27, 1999

[54] VOLTAGE FEEDFORWARD CONTROL SYSTEM FOR A SPINDLE MOTOR OF A DISK DRIVE

[75] Inventor: George Jeffrey Bennett, Murietta, Calif.

[73] Assignee: Western Digital Corporation, Irvine, Calif.

[21] Appl. No.: 08/972,939

[22] Filed: Nov. 18, 1997

[51] Int. Cl.[6] ................................................. H02P 7/00
[52] U.S. Cl. ........................ 318/254; 318/432; 318/479; 369/239
[58] Field of Search ................................... 318/138, 254, 318/439, 432, 433, 478, 479, 504; 360/73.01; 369/189, 239

[56] References Cited

U.S. PATENT DOCUMENTS

| | | | |
|---|---|---|---|
| 4,541,039 | 9/1985 | Sandler | 363/21 |
| 4,764,856 | 8/1988 | Rausch | 363/21 |
| 4,791,544 | 12/1988 | Gautherin et al. | 363/49 |
| 4,809,150 | 2/1989 | Limuti et al. | 363/21 |
| 4,862,054 | 8/1989 | Schauder | 318/800 |
| 4,933,829 | 6/1990 | White | 363/95 |
| 4,996,638 | 2/1991 | Orr | 363/21 |
| 5,117,347 | 5/1992 | Rebello et al. | 363/56 |
| 5,204,593 | 4/1993 | Ueki | 318/254 |
| 5,241,251 | 8/1993 | Wakui | 318/599 |
| 5,757,751 | 5/1998 | Chapman | 369/54 |
| 5,760,563 | 6/1998 | Bennett | 318/641 |

*Primary Examiner*—Bentsu Ro
*Attorney, Agent, or Firm*—Leo J. Young, Esq.; Milad G. Shara, Esq.

[57] ABSTRACT

A spindle motor of a disk drive is controlled in a switched voltage mode. A power bus supplies a voltage to the spindle motor. The power bus voltage is subject to variations while the spindle motor is being driven. An uncompensated motor voltage signal is modified to provide a compensated signal having a modified duty cycle. The modified duty cycle is inversely proportional to the variations in the power bus voltage. Commutation logic uses the compensated signal to generate commutation commands, which cause a power driver stage to energize the windings of the spindle motor.

10 Claims, 9 Drawing Sheets

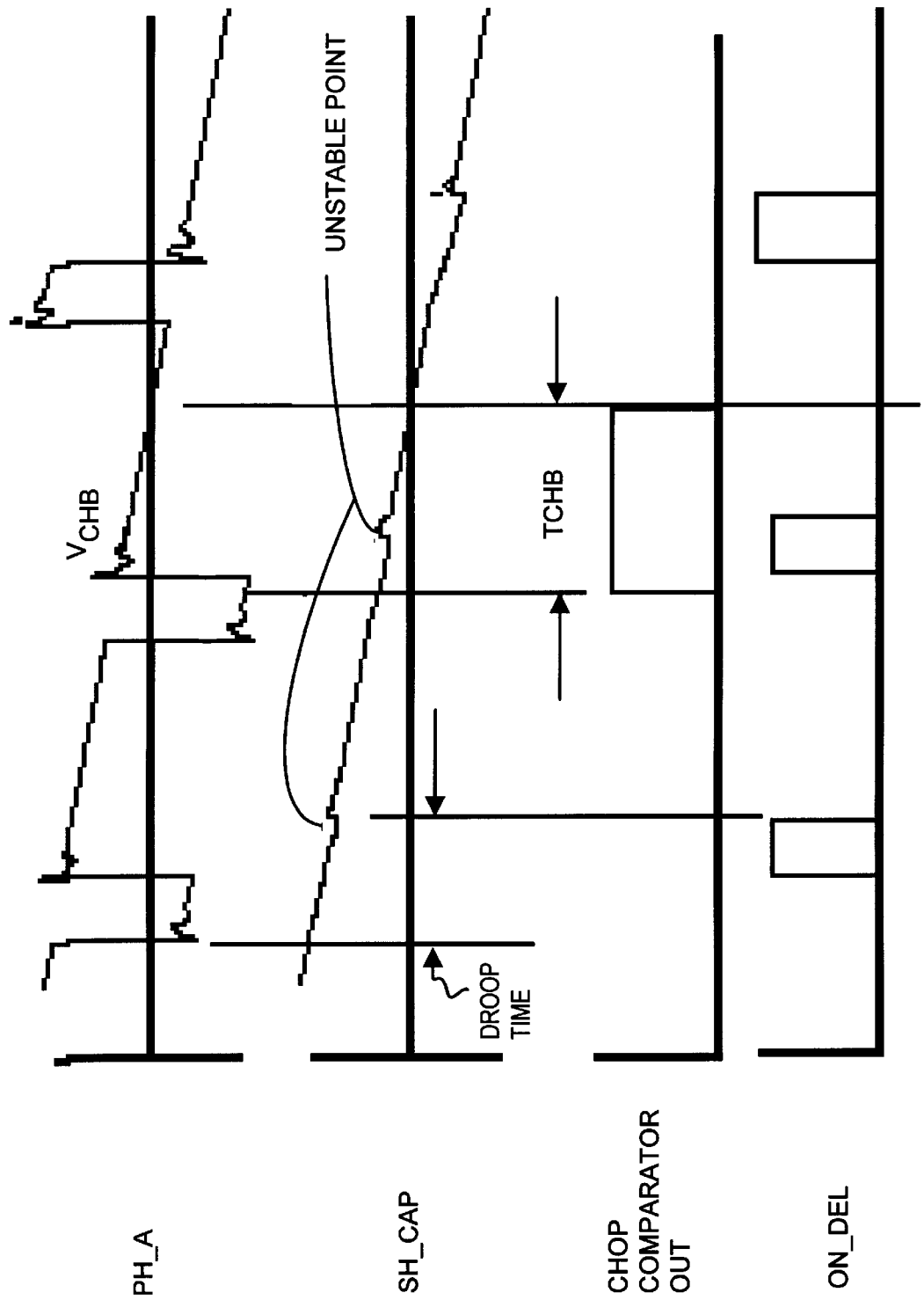

VOLTAGE FEEDFORWARD CONTROL SYSTEM FOR A SPINDLE MOTOR OF A DISK DRIVE

BACKGROUND OF THE INVENTION

1. Field of the Invention

The invention relates generally to disk drives. More specifically, the invention relates to a system for controlling a spindle motor in a switched or chopped voltage mode.

2. Description of the Prior Art

Disk drive manufactures are continually striving to increase sustained data transfer rates of their disk drives. Sustained data transfer rates can be increased by increasing the spin rate of the disk drive's platters, which store encoded data. The faster the platters can be spun, the faster data can be written to, and read from, the platters. The faster spin rates, in turn, can be realized by utilizing bigger, faster spin motors, having larger windings and higher currents flowing through the windings.

Increasing the size and speed of the spindle motor places a greater demand on the system for controlling the speed of the motor. A current control maintains the spin rate of the motor at a near-constant level. For example, a spindle motor having a design speed of 5400 rpm is controlled to spin within 5.5 rpm (±0.1%) of that design speed. If the current control allows the motor to spin more than 5.5 rpm above the design speed, data might be mistakenly written to a servo burst area on the track of a platter. Consequently, all data on that track would be lost, and the track itself would become permanently unusable.

Linear current controls are not well-suited for controlling the bigger, faster spin motors. As speed and power increase, driver power dissipation becomes excessive. Therefore, attention has been focused on switched driver techniques.

Switched current controls using current feedback have been used in disk drives. The switched driver techniques reduce the problem of driver power dissipation. However, the switched current controls have inherent stability problems. Overcoming the stability problems requires the addition of complex circuitry, which adds to the cost of the disk drive. Additionally, the switched current controls have acoustic problems.

Switched voltage controls without voltage feedback have been considered impractical for disk drives. Variations can occur in the power supplied to the spindle motor. The variations can be caused by CD ROM drives and other devices sharing power with the disk drive. Without voltage feedback, the voltage control does not stop a voltage spike from increasing the speed of the spindle motor and causing data to be mistakenly written to a servo burst area on the track of a platter.

Consequently, disk drive manufacturers have chosen to stay with expensive and inefficient current controls for regulating motor current. In the very cost-competitive, cost-sensitive market for hard disk drives of personal computers, however, the additional expense of the current control is borne almost entirely by the disk drive manufacturer.

An inexpensive and efficient system for controlling the speed of the spindle motor is needed.

SUMMARY OF THE INVENTION

The invention can be regarded as a disk drive comprising a spindle motor having a plurality of windings; means for generating an uncompensated motor voltage signal; means, responsive to the uncompensated motor voltage signal, for generating a control signal representing an average voltage for the spindle motor; a power bus for carrying a power supply potential that is subject to variations while the spindle motor is being driven; circuit means for generating a pulse width modulated signal having a duty cycle that is inversely proportional to magnitude of the power supply potential and is directly proportional to the control signal representing average spindle motor voltage; commutation logic, responsive to the pulse width modulated signal, for generating pulse width modulated commutation commands; and a power driver stage operable in a switched voltage mode. The commutation commands cause the power driver stage to provide a switched power bus voltage to the windings of the spindle motor in order to drive the spindle motor. The circuit means cancels undesirable variations in motor speed due to the variations in the power supply potential.

The invention can also be regarded as a power driver chip for use in a disk drive. The disk drive includes a spindle motor having a plurality of windings, means for generating a switched motor voltage control signal, and a power bus for carrying a voltage that is subject to variations while the spindle motor is being driven. The power driver chip comprises a compensation circuit for modifying the motor voltage control signal to provide a compensated signal having a modified duty cycle. The modified duty cycle is inversely proportional to variations in the voltage on the power bus. The power driver chip further includes commutation logic, responsive to the compensated signal, for generating pulse width modulated commutation commands; and a power driver stage operable in a switched voltage mode. The commutation commands cause the power driver stage to provide a switched power bus voltage to the windings of the spindle motor in order to drive the spindle motor. As a result, the compensation circuit cancels undesirable variations in motor speed due to the variations in the power bus voltage.

The invention can also be regarded as a method of operating a spindle motor. The method comprises the steps of generating a control signal representing an average voltage for the spindle motor; generating a pulse width modulated signal having a duty cycle that is inversely proportional to magnitude of the power bus voltage and is directly proportional to the control signal; and using the pulse width modulated signal to operate the power driver stage in a switched voltage mode. The pulse width modulated signal compensates for undesirable variations in motor speed due to the variations in the power bus voltage.

BRIEF DESCRIPTION OF THE DRAWINGS

FIG. 5a is a timing diagram for the method of FIG. 5;

DESCRIPTION OF THE PREFERRED EMBODIMENTS

Figure 1:
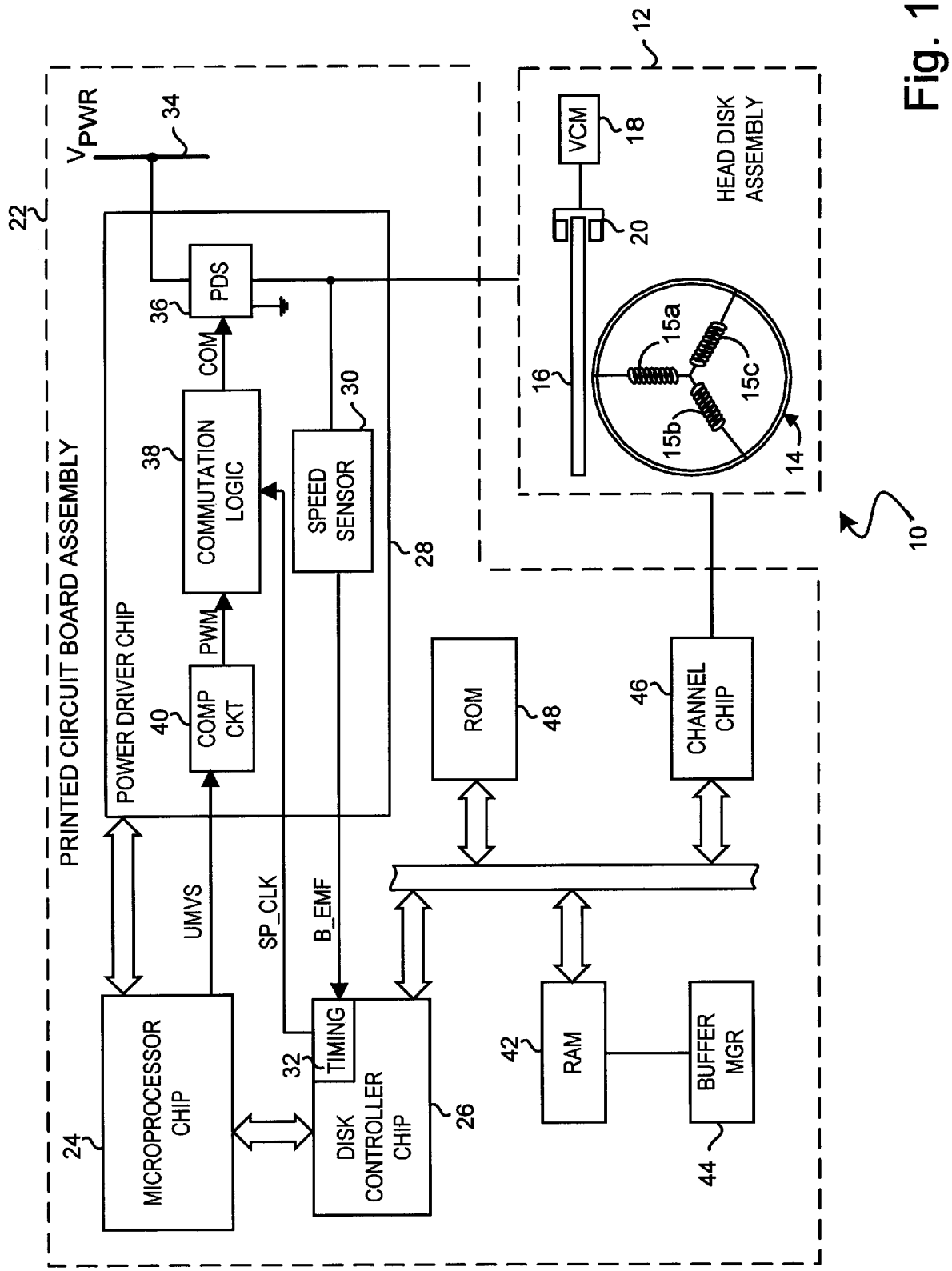
FIG. 1 is a block diagram of a disk drive according to the present invention.

With reference to FIG. 1, a disk drive generally indicated at 10 comprises a head disk assembly 12 including a spindle motor 14 and a plurality of platters 16. The head disk assembly 12 also includes a voice coil motor 18 and a head stack 20. The spindle motor 14 is a dc brushless motor including a permanent magnet rotor and three-phase stator windings 15A, 15B, 15C. Such a motor is typical for disk drives. During operation of the spindle motor 14, the rotor induces a back emf in the stator windings 15A, 15B, 15C.

The disk drive 10 further comprises a printed circuit board assembly 22 including a microprocessor chip 24, a disk controller chip 26, and a power driver chip 28. The power driver chip 28 includes a motor speed sensor 30, which detects the back emf of the spindle motor 16 and provides a digital signal B_EMF representing back emf of the spindle motor 14. The back emf signal B_EMF includes a train of pulses, the frequency of which is proportional to the back emf in the spindle motor 14. Generation and processing of the back emf signal B_EMF will be described below in connection with FIGS. 5 and 5a.

The back emf signal B_EMF is supplied to a timing circuit 32 in the disk controller chip 26. The timing circuit 32 generates a timing signal SP_CLK for indicating commutation times of the spindle motor 14. In addition to generating the timing signal SP_CLK, the disk controller chip 26 also deduces disk speed.

The microprocessor chip 24 modifies the deduced disk speed from the disk controller chip 26 to generate an uncompensated motor voltage signal UMVS for controlling the voltage of the spindle motor 14. The microprocessor chip 24 uses a switched voltage technique. The uncompensated motor voltage signal UMVS includes a train of pulses, the duty cycle (that is, pulse widths or on-times) of which determines the voltage of the spindle motor 14.

It should be noted that the back emf signal B_EMF provides a usable indication of motor speed when the spindle motor 14 is operating above a minimum speed. When the spindle motor speed is below the minimum speed, however, the back emf signal B_EMF has a signal-to-noise ratio that is too low to provide a usable indication of motor speed. Instead of relying on the back emf signal B_EMF, the disk controller chip 26 uses a profile for ramping up the speed of the spindle motor, until the back emf signal B_EMF can be used.

The printed circuit board assembly 22 further includes a power bus 34. The power bus 34 carries a power supply potential that is subject to variations while the spindle motor 14 is being driven, The power driver chip 28 includes a power driver stage 36, commutation logic 38 and a compensation circuit 40. The compensation circuit 40 generates a pulse width modulated ("PWM") signal having a duty cycle that is inversely proportional to magnitude of the power supply potential and is directly proportional to a control signal representing average spindle motor voltage. The compensation circuit 40 is a feedforward voltage control that cancels undesirable variations in motor speed due to the variations in the power supply potential. Voltage feedback is not needed.

The commutation logic 38 receives the PWM signal from the compensation circuit 40 and generates pulse width modulated commutation commands COM according to the following table.

| State | A | B | C |
|-------|---|---|---|
| 1 | 1 | X | 0 |
| 2 | X | 1 | 0 |
| 3 | 0 | 1 | X |
| 4 | 0 | X | 1 |
| 5 | X | 0 | 1 |
| 6 | 1 | 0 | X | where "1" represents a high voltage level for a winding, "0" represents a low voltage level for the winding, and "X" represents a tristate condition, in which the voltage level can be between 0 and 1. The commutation logic 38 can include a state machine that transitions from state to state in response to the timing signal SP_CLK. Thus, in response to a pulse, the commutation logic 38 switches to the next state. For example, if the commutation logic 38 is energizing the windings 15A, 15B, 15C according to the state 1 (A=1, B=X, C=0), a pulse in the timing signal SP_CLK will cause the commutation logic 38 to transition to state 2 (A=X, B=1, C=0).

The commutation logic 38 pulse width modulates the commutation commands COM according to the PWM signal supplied by the compensation circuit 40.

Figure 2:
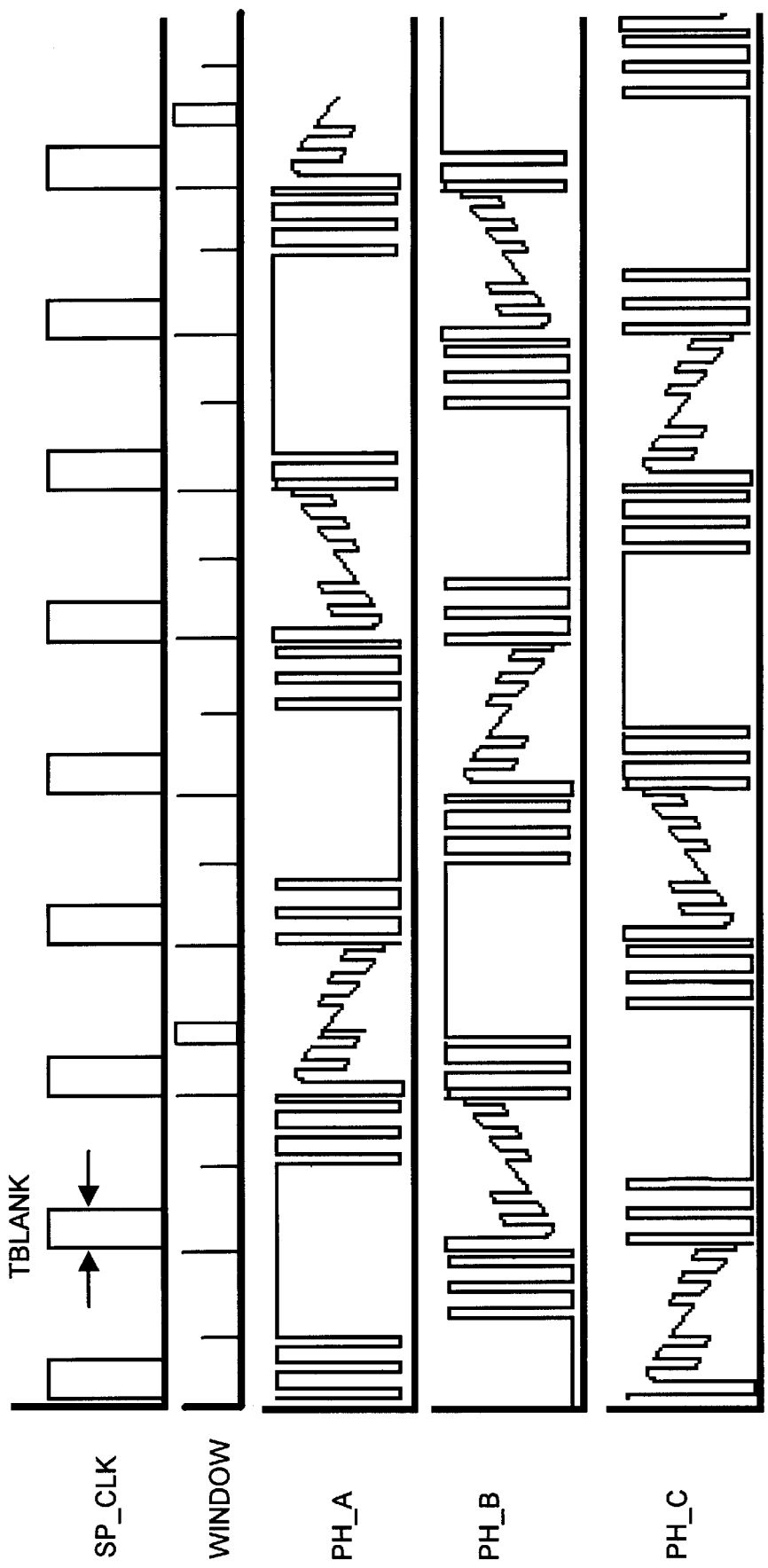
FIG. 2 illustrates waveforms for phase windings of a spindle motor, which forms a part of the disk drive shown in FIG. 1.

In response to the commutation commands COM, the power driver stage 36 switches the voltage on the power bus 34 to selectively energize the windings 15A, 15B and 15C and create a motor torque that drives the spindle motor 14. FIG. 2 shows the waveforms for the windings 15A, 15B, 15C during the run mode of operation (spindle motor 14 running at its operational speed).

Thus, the compensation circuit 40 allows the spindle motor 14 to be operated in a switched voltage mode during the run mode of operation. Because current feedback is not required, inefficient and expensive current controls are not required. Because the spindle motor drivers in the power drive stage are not on all of the time, power consumption is reduced. While the spindle motor 14 is being operated in the run mode, read and write operations to the platters 16 can be performed reliably and without fear that variations in the power supply potential might cause data or servo sectors on the platters 16 to be overwritten.

When a write operation is performed, data is received from a host (e.g., a computer motherboard) and buffered in a RAM buffer 42 under control of a buffer manager 44. The disk controller chip 26 performs error code correction ("ECC") encoding such as Reed-Solomon encoding on the buffered data. The ECC-encoded data is sent to a write channel of a channel chip 46. The write channel, in turn, performs additional encoding and digital-to-analog conversion. An output of the write channel is supplied to the transducers for writing to the platters 16.

When a read operation is performed, encoded data and servo data on the platters 16 are read by head stack transducers and sent to a read channel of the channel chip 46. The read channel separates the encoded data from the servo data, and performs analog-to-digital conversion and decoding. An output of the read channel is buffered in the RAM buffer 42. The disk controller chip 26 also performs error correction on the buffered data before the buffered data is sent to the host.

In addition to generating the uncompensated motor voltage signal UMVS, the microprocessor chip 24 controls the sequencing of the read and write operations. A ROM 48 is programmed with instructions for instructing the microprocessor chip 24 to perform its various control functions.

Figure 3:
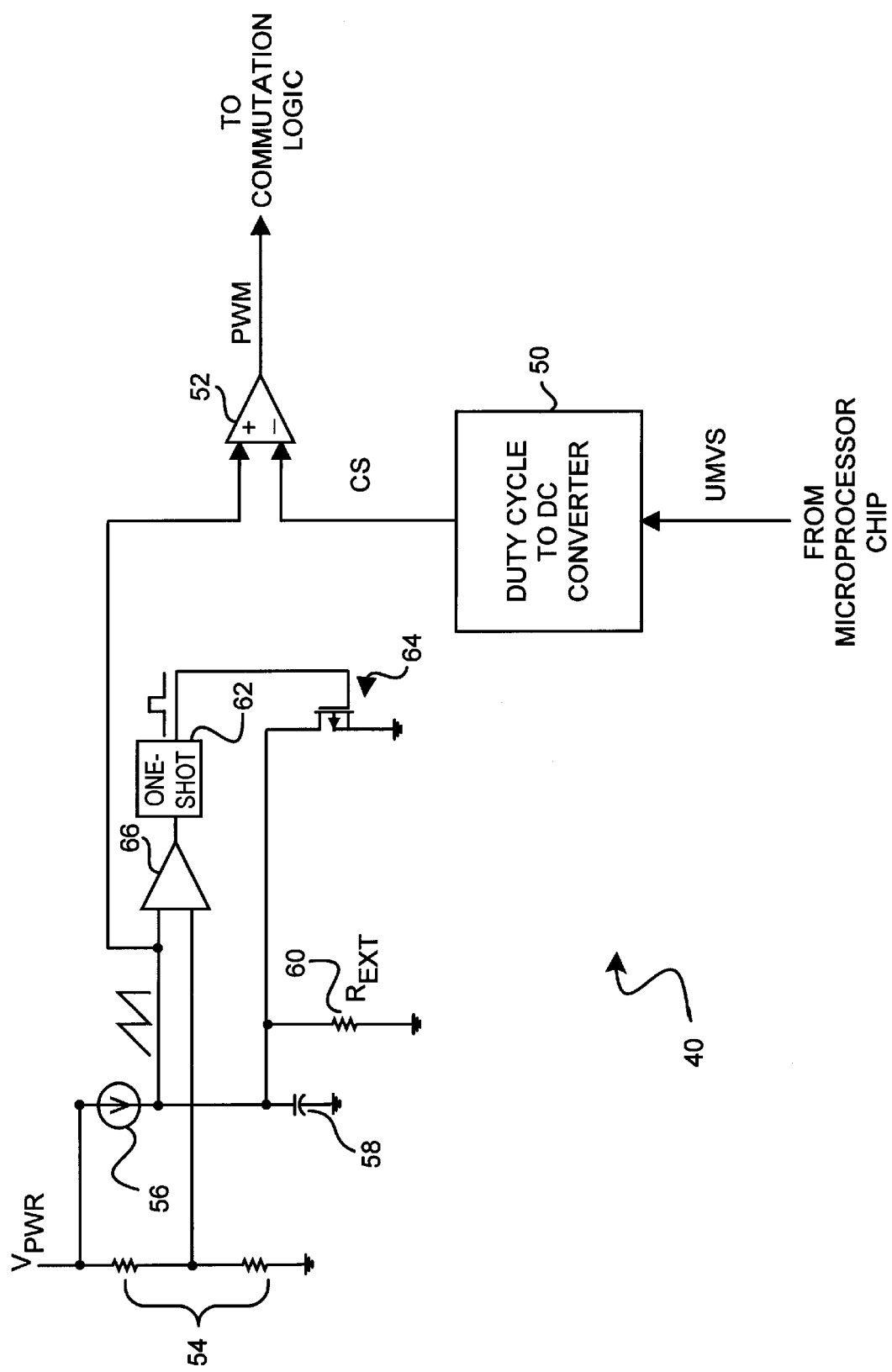
FIG. 3 is a block diagram of an analog compensation circuit for a power driver chip, which forms a part of the disk drive shown in FIG. 1.

FIG. 3 shows the compensation circuit 40, which is realized using an analog technique. A duty cycle-to-dc converter 50 converts the uncompensated motor voltage signal UMVS from the microprocessor chip 24 a control signal CS representing an average motor voltage for the spindle motor 14. The control signal CS is supplied to a first comparator 52.

A ramped sawtooth waveform is supplied to another input of the first comparator 52. The ramped sawtooth waveform is generated by a combination of a resistive ladder 54, a current source 56, a capacitor 58, an off-chip resistor 60, a one-shot 62, a FET 64 and a second comparator 66. Current from the current source 56 is proportional to the voltage Vpwr on the power bus 34. The current from the current source 56 is used as a reference current for generating a chop frequency. The current charges the capacitor 58. When the voltage on the capacitor 58 reaches a certain percentage (e.g., 50%) of the power bus voltage Vpwr (as set by the resistive ladder 54), the second comparator 66 turns on the one-shot 62, which generates a pulse causing the capacitor 58 to discharge through the FET 64. The one-shot 62 provides for a minimum off time to occur in the output of the spindle motor waveforms. Resulting is a constant frequency chop. The frequency of the chop is established by the capacitor 58 and the off-chip resistor 60. The chop frequency is typically above 20 kHz, which is above the audible range.

Peak amplitude of the sawtooth waveform is proportional to the power bus voltage Vpwr. Increases in the power bus voltage Vpwr will cause increases in the peak amplitude of the sawtooth waveform, and decreases in power bus voltage Vpwr will cause decreases in the peak amplitude of the sawtooth waveform. For example, if the power bus voltage Vpwr rises suddenly, the reference voltage for the second comparator 66 will increase and the capacitor 58 will charge to a higher voltage before the reset pulse is initiated. Resulting will be a higher peak amplitude for the sawtooth waveform.

The first comparator 52 compares the sawtooth waveform to the control signal CS representing the average spindle motor voltage. An output of the first comparator 52 provides the PWM signal having a duty cycle that is compensated for any variations in the power bus voltage. Thus, $$Ton/T = Vdc/KVpwr$$

where time Ton is the on-time of the PWM signal, time T is the chop period, voltage Vdc represents the average spindle motor voltage, and voltage Vpwr represents the peak amplitude of the sawtooth waveform. An increase in the peak amplitude of the sawtooth waveform will result in a decrease in the duty cycle of the pulse width modulated signal PWM. Conversely, a decrease in the peak amplitude of the sawtooth waveform will result in an increase in the duty cycle of the PWM signal.

Figure 4:
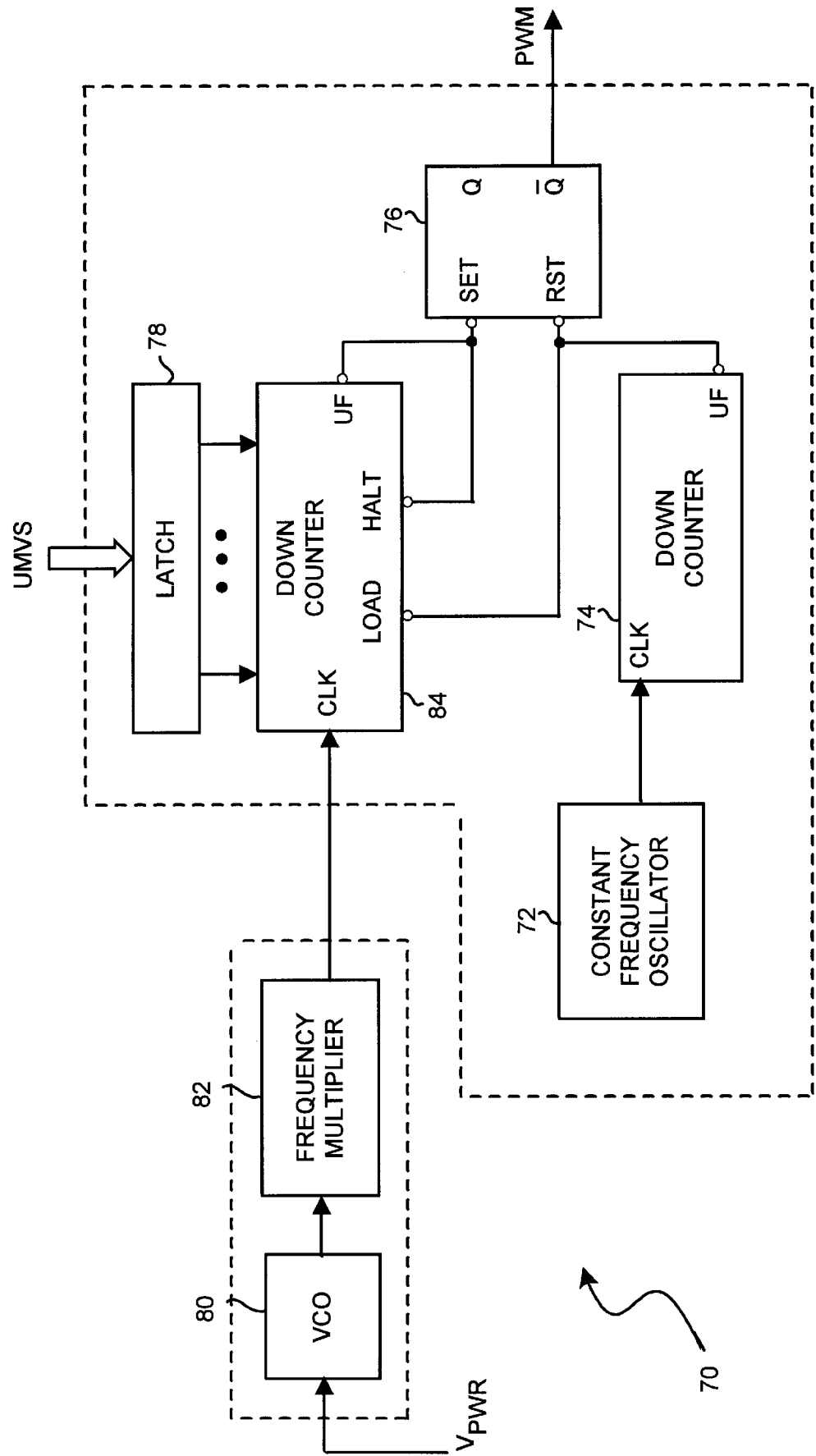
FIG. 4 is a block diagram of a digital compensation circuit for the power driver chip.

Reference is now made to FIG. 4, which shows a compensation circuit 70 that is realized using a digital technique. A constant frequency oscillator 72 and a first down counter 74 cooperate to generate a reset pulse at the start of every switching period T. The reset pulse from the first down counter 74 causes the output of a flip flop 76 to go high.

The microprocessor chip 24 stores a digital value representing average spindle motor voltage speed in a latch 78. An analog-to-frequency conversion of the power bus supply Vpwr is performed by a voltage controlled oscillator 80 and a frequency multiplier 82. Each pulse generated by the frequency multiplier 82 causes a second down counter 84 to count down from the digital value representing average spindle motor voltage. Increases in the power bus voltage Vpwr will cause the second down counter 84 to count faster and the flip flop 76 to create a trailing edge sooner. Thus, an increase in the power bus voltage Vpwr will cause the pulse width of the pulse width modulated signal PWM to shorten. Conversely, decreases in the power bus voltage Vpwr will cause the second down counter 84 to count slower and the trailing edge to be created later, thereby increasing pulse width of the pulse width modulated signal PWM.

Figure 5:
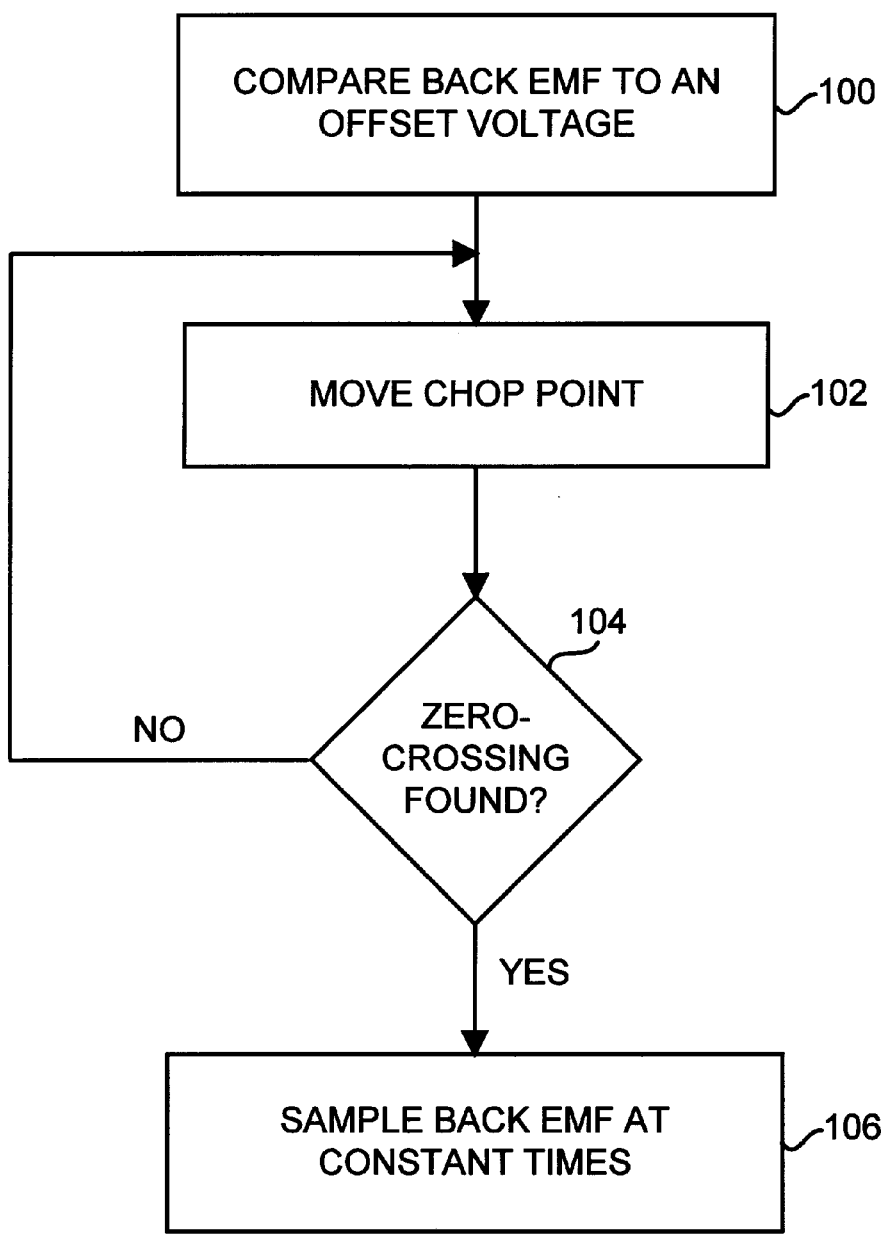
FIG. 5 is a flowchart of a method of detecting back emf.

FIGS. 5 and 5a show a method of detecting the back emf, which is used for signal timing and speed feedback. Zero-crossings of one of the windings is examined. On-delay pulses are generated by a comparator (see comparator UIC of FIG. 7), which compares the back emf waveform against a small offset voltage (step 100). By sampling the back emf between the on-delay pulses, the zero-crossing can be detected. This involves moving the chop point back and forth in order to detect the zero-crossing (step 102). The chop point need only be moved once or twice. Once the zero-crossing is found (step 104), the zero crossing can be sampled at constant sample time (step 106). The constant sample time T allows for detection of the back EMF signal. Because back emf is detected at a fixed frequency, there is no need to sweep through a range of frequencies to find the back emf signal. Consequently, noise and switching power dissipation are reduced.

Figure 6:
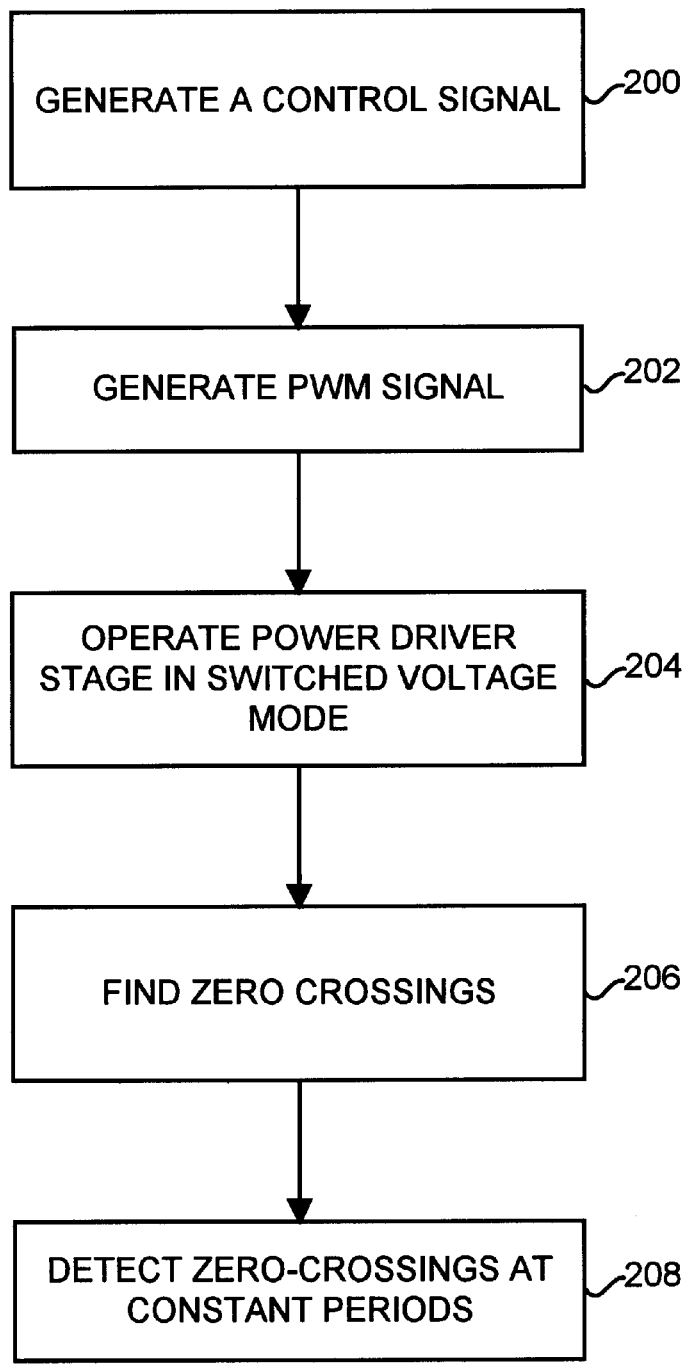
FIG. 6 is a flowchart of a method of operating the spindle motor.

FIG. 6 shows a method of operating the spindle motor 14. The method includes the steps of generating a control signal representing an average voltage for the spindle motor (step 200), generating a PWM signal having a duty cycle that is inversely proportional to magnitude of the power supply potential and is directly proportional to the control signal representing average spindle motor voltage (step 202); and using the PWM signal to operate the power driver stage in a switched voltage mode (step 204). During commutation, a zero-crossing is found (step 206). Back emf, which is used for speed feedback, is thereafter detected at a constant period (step 208).

Figure 7:
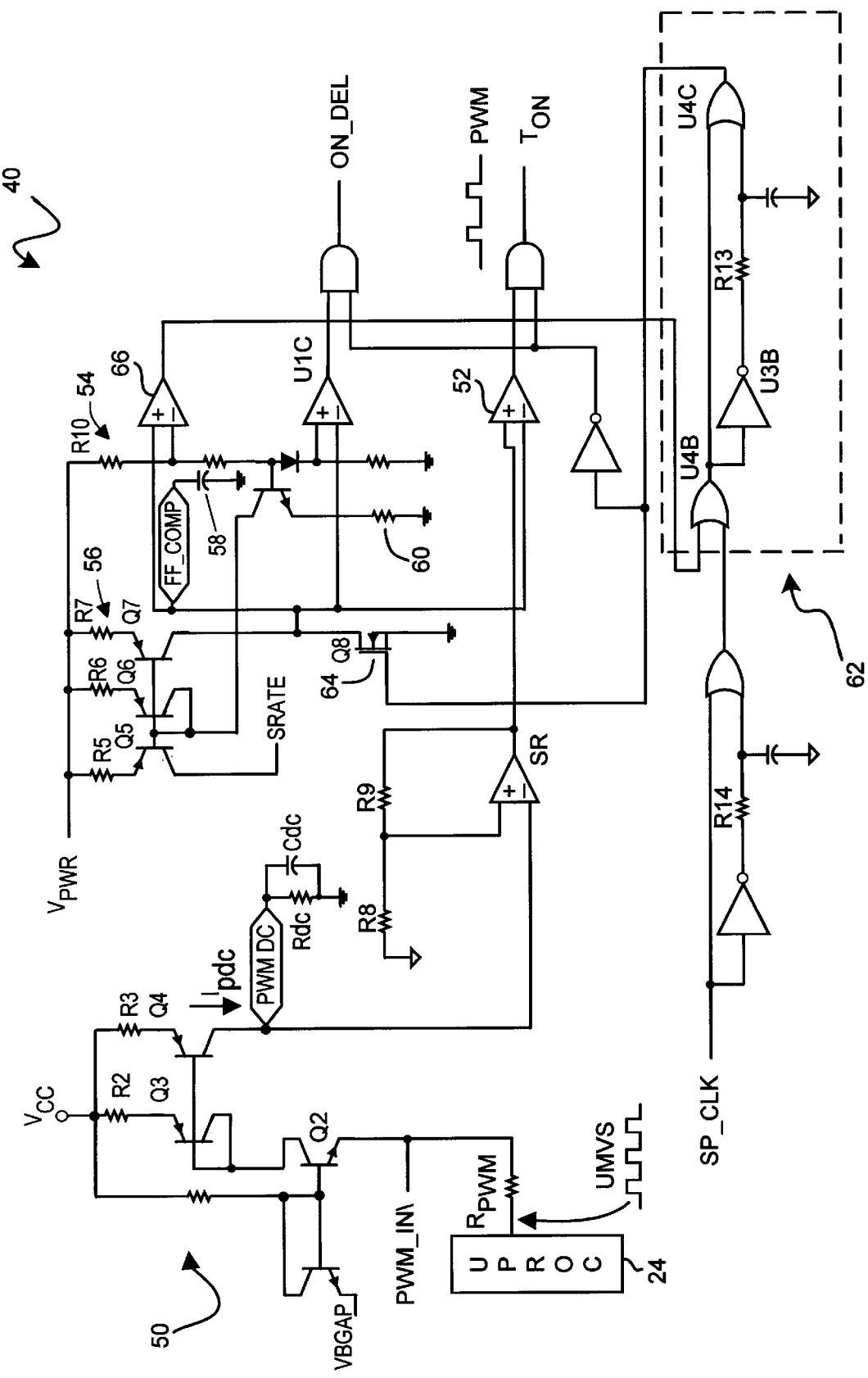
FIG. 7 is a schematic diagram of an embodiment of the analog compensation circuit shown in FIG. 2.

Reference is now made to FIG. 7, which shows an embodiment of the analog compensation circuit 40. The microprocessor chip 24 supplies the uncompensated motor voltage signal UMVS to the duty cycle-to-dc converter 50, which includes transistors Q1, Q2, Q3 and Q4. Transistor Q2 receives current from the voltage control signal, and the current is mirrored in transistors Q3 and Q4. The transistors Q1 to Q4 avoid power supply variations. Mirrored current Ipdc charges a capacitor Cdc which, with resistor Rdc, forms a simple RC network. Voltage on the capacitor Cdc is amplified by amplifier SR, the gain of which is determined by resistors R8 and R9. An output of the gain amplifier SR provides the control signal CS representing the average spindle motor voltage. A digital to analog converter could be used in place of the transistors Q1 to Q4.

Transistors Q6 and Q7 form the current source 56, and resistors R10 and R11 form the resistive ladder 54. The current flows around the transistors Q6 and Q7 and into the capacitor 58. The capacitor 58 is charged with the current from the current source 52.

The second comparator 66 compares the voltage on the capacitor 58 to a percentage of the power bus voltage Vpwr. When the output of the second comparator 66 goes high, the one shot 62 generates a pulse. The one-shot 62 is formed by gates U4B, U3B and U4C. The pulse causes the capacitor 58 to discharge through the transistor 64.

The ramped sawtooth waveform is supplied to the inverting input of the first comparator 52, and an output of the gain amplifier SR is supplied to the non-inverting input of the first comparator 52. The output of the first comparator 52 provides the PWM signal.

Figure 8:
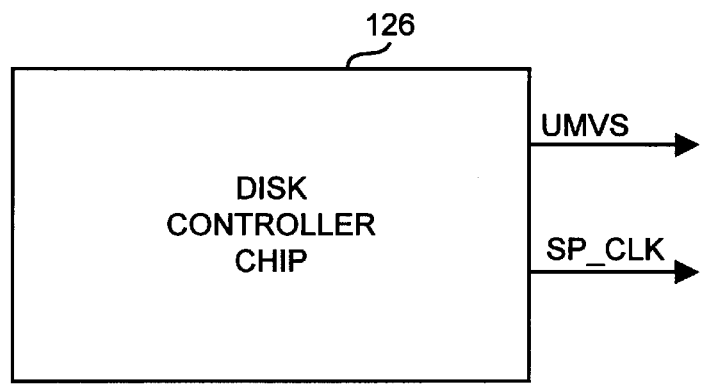
FIG. 8 is an alternative embodiment of a disk controller chip, which forms a part of the disk drive of FIG. 1.
Figure 9:
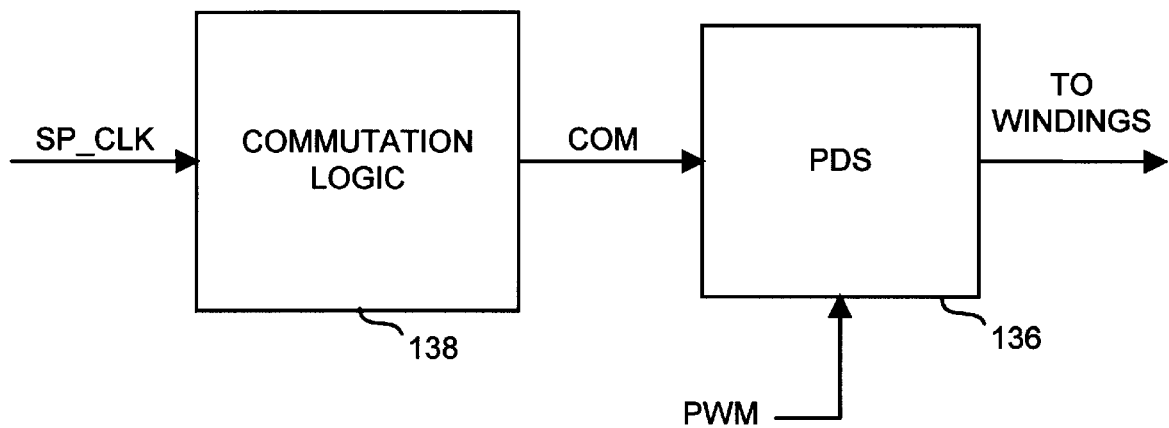
FIG. 9 is an alternative embodiments of commutation logic and a power driver stage, both of which form a part of the disk drive of FIG. 1.

FIGS. 8 and 9 show other embodiments of the invention. FIG. 8 shows that the disk controller chip 126 can generate the uncompensated motor voltage signal UMVS instead of the microprocessor chip. FIG. 9 shows that pulse width modulation can be performed in power driver stage 136 instead of the commutation logic 138. The timing signal SP_CLK is supplied to the commutation logic 138, and unmodulated commutation commands COM are provided to the power driver stage 136. The PWM signal is provided directly to the power driver stage 136. The power driver stage 136 includes an extra solid state driver for performing pulse width modulation.

We claim:

1. A disk drive comprising:

a spindle motor having a plurality of windings;

means for generating an uncompensated motor voltage signal;

means, responsive to the uncompensated motor voltage signal, for generating a control signal representing an average voltage for the spindle motor;

a power bus for carrying a power supply potential that is subject to variations while the spindle motor is being driven;

circuit means for generating a pulse width modulated signal having a duty cycle that is inversely proportional to magnitude of the power supply potential and is directly proportional to the control signal representing average spindle motor voltage;

commutation logic, responsive to the pulse width modulated signal, for generating pulse width modulated commutation commands; and a power driver stage operable in a switched voltage mode, the commutation commands causing the power driver stage to provide a switched power bus voltage to the windings of the spindle motor in order to drive the spindle motor;

whereby the circuit means cancels undesirable variations in motor speed due to the variations in the power supply potential.

2. The disk drive of claim 1, wherein the circuit means includes:

means for converting the uncompensated motor voltage signal to a dc signal, a level of the dc signal being proportional to on-time of the uncompensated motor voltage signal;

means for generating a periodic varying sloped signal having an amplitude that is proportional to the power bus voltage; and means for comparing the sloped signal to the dc signal, an output of the comparing means providing the pulse width modulated signal.

3. The disk drive of claim 1, wherein the circuit means includes:

first means for creating leading edges in the pulse width modulated signal at a fixed frequency; and second means for creating trailing edges in the pulse width modulated signal at a frequency that is inversely proportional to the power supply potential.

4. The disk drive of claim 1, wherein the circuit means includes:

an oscillator for generating first pulses at a fixed frequency;

a first modulo counter for counting the first pulses;

means for generating second pulses at a frequency that is proportional to the voltage applied to the spindle motor;

a second modulo counter for counting pulses to a number indicating an average spindle motor voltage; and a flip flop for generating pulses having leading edges and trailing edges, a leading edge being generated when the first modulo counter is reset, a trailing edge being generated when the second modulo counter reaches the number.

5. A power driver chip for use in a disk drive, the disk drive including a spindle motor having a plurality of windings, means for generating an uncompensated motor voltage signal, and a power bus for carrying a voltage that is subject to variations while the spindle motor is being driven, the power driver chip comprising:

a compensation circuit for modifying the uncompensated motor voltage signal to provide a compensated signal having a modified duty cycle, the modified duty cycle of the compensated motor voltage signal being inversely proportional to variations in the voltage on the power bus;

commutation logic, responsive to the compensated signal, for generating pulse width modulated commutation commands; and a power driver stage operable in a switched voltage mode, the commutation commands causing the power driver stage to provide a switched power bus voltage to the windings of the spindle motor in order to drive the spindle motor;

whereby the compensation circuit compensates for undesirable variations in motor speed due to the variations in the power bus voltage.

6. The power driver chip of claim 5, wherein the compensation circuit includes:

means for converting the uncompensated motor voltage signal to a dc signal, level of the dc signal being proportional to on-time of the uncompensated motor voltage signal;

means for generating a periodic varying sloped signal having an amplitude that is proportional to the power bus voltage; and means for comparing the sloped signal to the dc signal, an output of the comparing means providing the compensated motor voltage signal.

7. The power driver chip of claim 5, wherein the circuit means includes:

first means for creating leading edges in the compensated motor voltage signal at a fixed frequency; and second means for creating trailing edges in the compensated motor voltage signal at a frequency that is inversely proportional to the power bus voltage.

8. The power driver chip of claim 5, wherein the circuit means includes:

an oscillator for generating first pulses at a fixed frequency;

a first modulo counter for counting the first pulses;

means for generating second pulses at a frequency that is proportional to the voltage applied to the spindle motor;

a second modulo counter for counting pulses to a number indicating a spindle motor speed; and a flip flop for generating pulses having leading edges and trailing edges, a leading edge being generated when the first modulo counter is reset, a trailing edge being generated when the second modulo counter reaches the number.

9. A method of operating a spindle motor of a disk drive, the spindle motor including a plurality of windings, the disk drive including a power driver stage and a power bus for carrying a power bus voltage that is subject to variations while the spindle motor is being driven, the method comprising the steps of:

generating a control signal representing an average voltage for the spindle motor;

generating a pulse width modulated signal having a duty cycle that is inversely proportional to magnitude of the power bus voltage and is directly proportional to the control signal representing average spindle motor voltage; and using the pulse width modulated signal to operate the power driver stage in a switched voltage mode;

whereby the pulse width modulated signal compensates for undesirable variations in motor speed due to the variations in the power bus voltage.

10. The method of claim 9, further comprising the step of detecting back emf at fixed time periods.

* * * * *